UNITED STATES PATENT OFFICE.

JOHN V. HECKER, OF NEW YORK, N. Y., ASSIGNOR TO GEORGE V. HECKER & CO., OF SAME PLACE.

IMPROVEMENT IN ACID-POWDERS AND PROCESSES OF PRODUCING THEM.

Specification forming part of Letters Patent No. 178,146, dated May 30, 1876; application filed April 13, 1876.

*To all whom it may concern:*

Be it known that I, JOHN V. HECKER, of the city of New York and State of New York, have invented a new and Improved Process for Making Acid-Powder, and also a new and improved powder, which, among other uses, may be employed in making self-raising flour.

To make my powder I proceed as follows: I take one hundred pounds of bone-black, or its equivalent of bone-ash. To this I add twenty-five pounds of sulphuric acid, diluted with sufficient water to make with the bone-black a semi-fluid mass. After standing twenty-four hours, I add to it forty-five pounds of muriatic acid diluted with about an equal quantity of water. I then add thirty-five pounds of common salt dissolved in about three times its weight of water to the mass. It is then allowed to stand about from ten to twelve hours. It is then leached and washed until the water ceases to have an acid taste. The solution thus obtained is then evaporated to dryness, and the product then appears as a white, dry, pulverulent mass.

The above-described process for making an acid-powder, suitable for use in making self-raising flour, has several advantages over other known methods, in which hydrochloric acid is employed. It dispenses with all necessity for pressing or otherwise separating out the mother-liquor, and by its means a larger amount of available acid is obtained from the amount of bone and acid used than by any other process. The product is extremely dry and pulverulent.

The proportions of the acids to the bones used admit of considerable variations, the essential feature of my invention consisting of the addition of common salt to the solution, in substantially the proportions stated, although the quantity of this also may be somewhat varied. Instead of common salt, other chlorides, such as chloride of potassium or of ammonium, may be used; or it may, in part, be replaced by the sulphates of soda, or potash, or alumina, or the carbonates of the same, in proportions corresponding to their respective chemical equivalents.

What I claim, and desire to secure by Letters Patent, is—

1. The above-described process of making an acid-powder, consisting of the treatment of bone-black with sulphuric acid first, and then with hydrochloric acid and chloride of sodium, and leaching and evaporating to dryness, substantially as hereinbefore set forth.

2. The within-described acid-powder, consisting of monocalcic ortho-phosphate, chloride of sodium, and chloride of calcium.

JOHN V. HECKER.

Witnesses:
PHILLIPS ABBOTT,
BARON HIGHAM.